Dec. 14, 1965 M. M. KAUFMAN 3,222,756

TECHNIQUES ASSOCIATED WITH INDUCTIVE SENSING
OF TUNNEL DIODE MEMORY CELLS

Filed Aug. 23, 1961

INVENTOR
MELVIN M. KAUFMAN

BY H. L. Gordon
AGENT.

3,222,756
TECHNIQUES ASSOCIATED WITH INDUCTIVE SENSING OF TUNNEL DIODE MEMORY CELLS

Melvin M. Kaufman, Merchantville, N.J., assignor, by mesne assignments, to the United States of America as represented by the Secretary of the Navy Filed Aug. 23, 1961, Ser. No. 133,533
2 Claims. (Cl. 29—155.5)

This invention relates to techniques associated with inductive sensing of tunnel diode memory cells and more particularly to a high speed transformer and sense line for tunnel diode memory cells having a rise time of less than 3 nanoseconds.

In designing an ultra high speed tunnel diode memory having a memory cycle time of 10 nanoseconds, the electromagnetic wave propagation time through wiring of approximately 8 inches is one nanosecond and requires that the memory unit and regeneration loop be as small as possible in order to avoid logical delays which will slow down the memory and negate its purpose.

One of the most significant parameters of an ultra high speed memory having a sense amplifier and a regeneration loop is the total gain-bandwidth required which should be held to a minimum. This gain-bandwidth parameter is expressed as follows:

$$\text{Gain-bandwidth}=\frac{1}{Tr}\frac{Vw}{Vo}(1-K_0^{-1})$$

where $Tr$=the "read" half select pulse width (approximately ⅓ the memory cycle time)
$Vw$=the magnitude of the "write" half select pulse
$Vo$=the peak magnitude of the memory output signal
$Ko$=the signal to noise ratio of the memory at the sense amplifier, including all factors.

Since T*r* is limited by the memory cycle time and V*w* is related to the current rating of the tunnel diode memory cells, V*o*, the memory output signal, should be made as large as possible.

As an example, for a 10 nanosecond cycle time, the minimum bandwidth needed for the amplifier is 300 megacycles. If the memory input drive signal is 1000 times or 60 db over the memory output sense signal, then a total gain-bandwidth of 300 kilomegacycles is needed.

Therefore, the output signal should be as large as possible with as little loss as possible between the memory cell and the sense amplifier.

An object of this invention therefore is to provide means for inductively sensing the output of a tunnel diode memory cell with as little signal loss as possible.

Another object of the invention is to reduce the size and time delay of the sensing system of a digital computer memory.

Another object of the invention is to keep the signal to noise ratio of a tunnel diode memory as high as possible so as to make as large a memory as possible.

Another object is to provide an improved novel process for making a multiple input, single output, high speed pulse transformer which will take up a very small volume for high density packaging.

Other objects and many of the attendant advantages of this invention will be readily appreciated as the same become better understood by reference to the following detailed description when considered in connection with the accompanying drawings wherein.

Figures 1, 2:
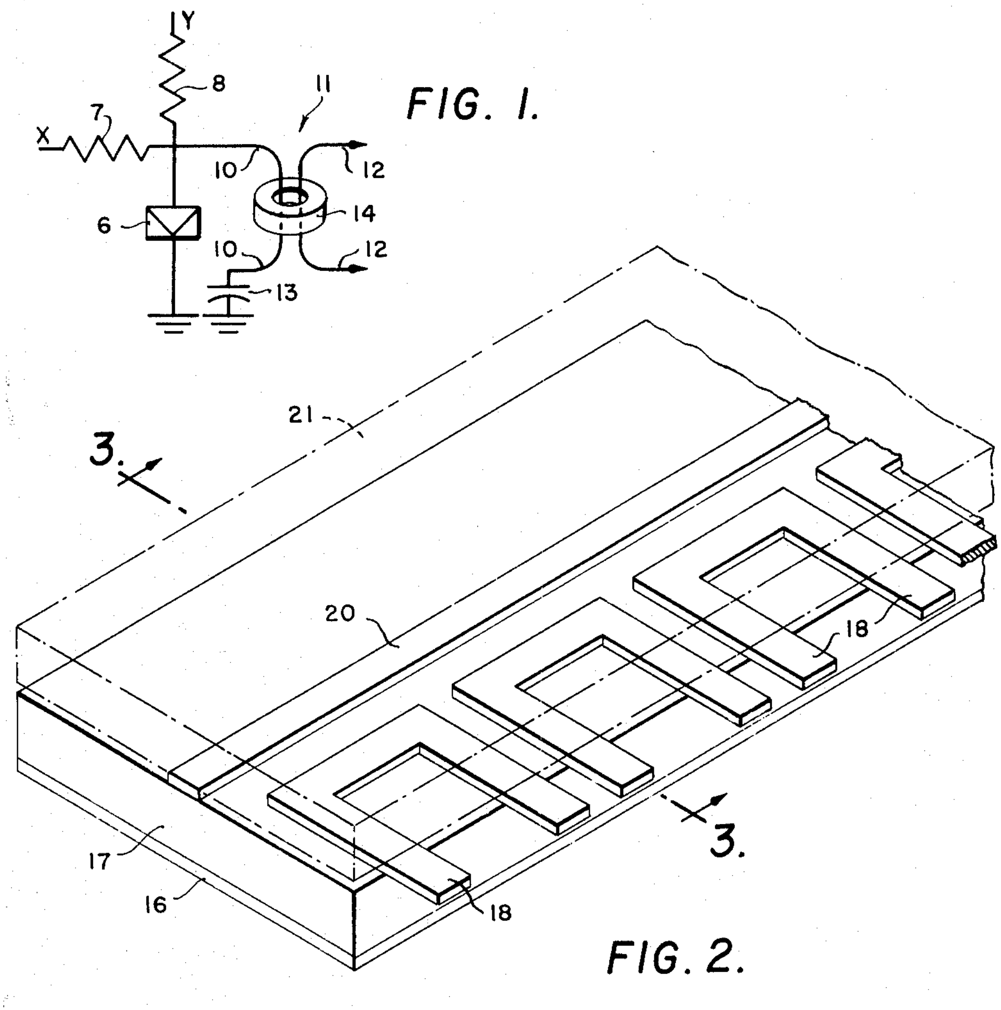
FIG. 1 is a schematic diagram of a tunnel diode memory cell and inductive sensing means.
FIG. 2 is an isometric view of the high speed plural input transformer.

Referring now to the drawings, FIG. 1 is a schematic view of a tunnel diode memory cell and inductive sensing means. A tunnel diode 6 is biased to one of two stable operating points by X selection resistor 7 and Y selection resistor 8, or by a third resistor (not shown) as described in "The Tunnel Diode as a Storage Element" by Miller et al., Digest of Technical Papers, 1960 International Solid State Circuits Conference, pp. 52–53. The application of coincident read pulses on the X and Y selection lines switches the diode 6 if a "one" is stored or generates a noise output if a "zero" is stored. This "one" signal or the noise appears across the primary 10 of transformer 11 where it is transformed to a "one" or "zero" on secondary 12 of the transformer. Capacitor 13 in series with the primary of transformer 11 prevents changes in the bias of tunnel diode 6 but allows tunnel diode 6 to switch and the read-out pulses to be passed by transformer 11.

Figure 3:
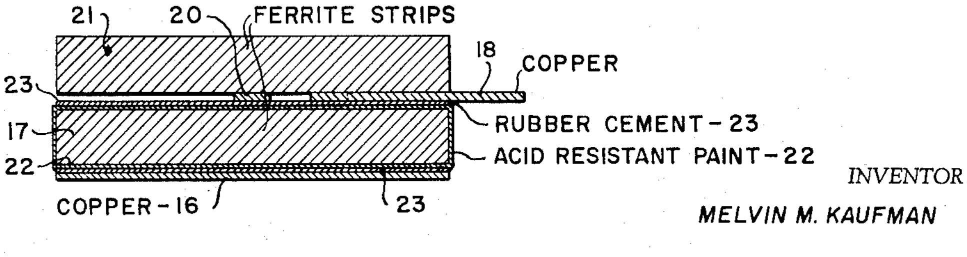
FIG. 3 is a cross-sectional view of the transformer taken along lines 3—3 of FIG. 2.

Transformer 11, while indicated schematically as having a toroidal case 14 in FIG. 1, is designed for high density packaging as shown in FIGS. 2 and 3.

In the specific embodiment disclosed, mechanically the transformer 11 consists of an .005 inch thick copper ground plane 16, a rectangular first ferrite inductive strip 17, a printed circuit transformer, having primaries 18 and a single secondary 20, which is printed on the first ferrite strip 17. A rectangular second ferrite strip 21 is pressed against the transformer to provide a high degree of coupling between the primaries and the secondary. The ferrite strips 17 and 21 are .030″ thick, .240″ wide, and 6.4″ long so as to provide space for thirty-two primaries 18. Each primary and the secondary have a one-to-one ratio.

The transformer was made by first painting the bottom strip 17 with an acid resistant paint 22 to prevent acid absorption by the ferrite strip during photo-etching. The ground plane 16 and a .002″ thick copper conductive sheet were bonded to the strip 17 with a rubber cement 23 such as sold under the trademark "Pliobond" by the Goodyear Tire and Rubber Co., Akron, Ohio.

A photographically reduced pattern of the design of the printed circuit transformer, as shown in FIG. 2, was used to produce an image on the copper sheet and the excess copper was etched away by a suitable etching process to produce primaries 18 and secondary 20.

The photo-etching process allows very small clearance between the primaries 18 and secondary 20, in the order of .005 inch and, therefore, with the inductive strips, allows a high degree of coupling.

The magnitude of the output from the transformer is dependent upon the permeability of the ferrite in this high coefficient of coupling transformer. However, the pulse output and rise time at the ends of the transformer depends upon the losses associated with the ferrite.

Tests have shown that a pulse transformer made in accordance with the above-described process and using ferrite strips made of a Manganese-zinc oxide such as types Q2 and Q3 made by General Ceramics, Keesbey, New Jersey, have a pulse rise time of 3 nanoseconds or less. The 3 nanosecond response time is considered satisfactory for a 10 nanosecond memory cycle time.

The strip method of transformer construction allows a single transformer unit to occupy .065 x .24 x .2 inch and to be suitable for mounting with other parts of the memory. In addition the placement of the ferrite strips around the transformer provides an excellent shield against noise, particularly against the half select or "read" pulses on the X and Y selection lines.

Obviously many modifications and variations of the present invention are possible in the light of the above teachings. It is therefore to be understood that within the scope of the appended claims the invention may be practiced otherwise than as specifically described.

What is claimed is:

1. The method of making a transformer unit for sensing tunnel diode memory cells, comprising the steps of:

providing first and second ferrite bodies, each of said bodies having opposed flat surfaces;

coating one ferrite body with an acid resistant material to prevent absorption of acid by said ferrite body;

cementing a thin copper plate to one of the opposed flat surfaces of the coated ferrite body;

photo-etching in the copper plate a transformer secondary and a plurality of transformer primaries adjacent to the secondary;

attaching a second thin copper sheet to the other of the opposed flat surfaces of the coated ferrite;

attaching the uncoated ferrite to the coated ferrite with one of the flat sides of the uncoated ferrite adjacent the transformer side of said coated ferrite.

2. The method according to claim 1 wherein said copper plate is approximately .002 inch thick; the ferrite bodies are each .030 inch thick and the ground plane is .005 inch thick, and wherein each of said ferrite bodies is constituted of a ferrite material having a characteristic pulse rise time approximately three nanoseconds.

References Cited by the Examiner

UNITED STATES PATENTS

| | | | |
|---|---|---|---|
| 2,843,829 | 7/1958 | Slate | 336—200 |
| 2,851,765 | 9/1958 | Hanlet | 29—155.5 |
| 2,910,662 | 10/1959 | Rex | 336—200 |
| 2,911,627 | 11/1959 | Kilburn et al. | 29—155.5 |
| 2,958,120 | 11/1960 | Taylor | 29—155.5 |
| 3,006,068 | 10/1961 | Anderson et al. | 29—155.5 |
| 3,110,087 | 11/1963 | Rajchman | 29—155.5 |

JOHN F. CAMPBELL, *Primary Examiner.*

JOHN T. BURNS, WHITMORE A. WILTZ, *Examiners.*